(12) United States Patent
Meng et al.

(10) Patent No.: US 12,537,458 B2
(45) Date of Patent: Jan. 27, 2026

(54) SYNCHRONOUS RECTIFIER DEVICE FOR POWER CONVERTER

(71) Applicant: Power Forest Technology Corporation, Hsinchu County (TW)

(72) Inventors: Che-Hao Meng, Hsinchu (TW); Chien Lung Li, Hsinchu County (TW); Chia-Hsien Liu, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 203 days.

(21) Appl. No.: 18/509,179

(22) Filed: Nov. 14, 2023

(65) Prior Publication Data

US 2025/0105753 A1     Mar. 27, 2025

(30) Foreign Application Priority Data

Sep. 27, 2023  (TW) .................... 112137135

(51) Int. Cl.
*H02M 3/335* (2006.01)
*H02M 1/00* (2006.01)
*H02M 1/32* (2007.01)

(52) U.S. Cl.
CPC ..... *H02M 3/33592* (2013.01); *H02M 1/0009* (2021.05); *H02M 1/32* (2013.01)

(58) Field of Classification Search
CPC .. H02M 3/33592; H02M 1/0009; H02M 1/32; Y02B 70/10
See application file for complete search history.

(56) References Cited

U.S. PATENT DOCUMENTS

| 9,768,703 | B2 * | 9/2017 | Yang ................ H02M 3/33592 |
| 9,899,931 | B1 | 2/2018 | Chang et al. |
| 10,056,845 | B1 | 8/2018 | Chu |
| 10,432,104 | B2 | 10/2019 | Li et al. |

(Continued)

FOREIGN PATENT DOCUMENTS

| CN | 112564498 | 3/2021 |
| CN | 112713778 | 4/2021 |
| CN | 116388526 | 7/2023 |

OTHER PUBLICATIONS

"Office Action of Taiwan Counterpart Application", issued on Sep. 27, 2024, p. 1-p. 7.

*Primary Examiner* — Monica Lewis
*Assistant Examiner* — Jye-June Lee

(57) ABSTRACT

A synchronous rectifier device for a power converter is provided. A power converter includes at least one secondary circuit and a transformer. The synchronous rectifier device includes a synchronous rectification circuit and a controller. The synchronous rectification circuit includes a synchronous rectification switch and a current receiving circuit. The synchronous rectification switch is coupled between the secondary circuit and a secondary winding of the transformer. The current receiving circuit provides a current signal based on a current flowing through the synchronous rectification switch. The controller controls the synchronous rectification switch according to the current signal. In a case that the synchronous rectification switch is turned off, when the current signal indicates that a current value of the current is greater than a predetermined value, the controller turns on the synchronous rectification switch.

6 Claims, 3 Drawing Sheets

(56) References Cited

U.S. PATENT DOCUMENTS

| | | |
|---|---|---|
| 10,566,829 B2 | 2/2020 | Tian et al. |
| 2004/0125621 A1* | 7/2004 | Yang ............... H02M 3/33592 |
| | | 363/21.14 |
| 2006/0018135 A1* | 1/2006 | Yang ............... H02M 3/33592 |
| | | 363/21.14 |
| 2010/0110732 A1* | 5/2010 | Moyer ............. H02M 3/33592 |
| | | 363/19 |
| 2016/0056704 A1* | 2/2016 | Deboy ............. H02M 3/33592 |
| | | 363/21.13 |
| 2020/0186049 A1 | 6/2020 | Yamasaki |
| 2024/0280645 A1* | 8/2024 | Khamesra ......... H02M 3/33592 |

* cited by examiner

SYNCHRONOUS RECTIFIER DEVICE FOR POWER CONVERTER

CROSS-REFERENCE TO RELATED APPLICATION

This application claims the priority benefit of Taiwan application serial no. 112137135, filed on Sep. 27, 2023. The entirety of the above-mentioned patent application is hereby incorporated by reference herein and made a part of this specification.

BACKGROUND

Technical Field

The disclosure relates to an electronic device, and particularly relates to a synchronous rectifier device for a power converter.

Description of Related Art

Generally, a power converter may use a synchronous rectification switch to perform a synchronous rectification operation to reduce energy loss in power conversion. The synchronous rectification switch must operate based on a control signal. Therefore, how to provide a correct control signal to accurately perform the synchronous rectification operation of the power converter is one of the research focuses of those skilled in the art.

SUMMARY

The disclosure is directed to a synchronous rectifier device for a power converter, which is adapted to accurately perform a synchronous rectification operation of the power converter.

The disclosure provides a synchronous rectifier device for a power converter. The power converter includes at least a secondary circuit and a transformer. The synchronous rectifier device includes a synchronous rectification circuit and a controller. The synchronous rectification circuit includes a synchronous rectification switch and a current receiving circuit. The synchronous rectification switch is coupled between the secondary circuit and a secondary winding of the transformer. The current receiving circuit receives a current flowing through the synchronous rectification switch, and provides a current signal based on the current. The controller is coupled to the current receiving circuit and a control terminal of the synchronous rectification switch. The controller controls the synchronous rectification switch according to the current signal. In a case that the synchronous rectification switch is turned off, when the current signal indicates that a current value of the current is greater than a predetermined value, the controller turns on the synchronous rectification switch.

Based on the above description, the current receiving circuit provides the current signal based on the current flowing through the synchronous rectification switch. The controller controls the synchronous rectification switch based on the current signal. In the case that the synchronous rectification switch is turned off, when the current signal indicates that the current value of the current is greater than a predetermined value, the controller turns on the synchronous rectification switch. In this way, the synchronous rectification device may accurately perform the synchronous rectification operation of the power converter.

DESCRIPTION OF THE EMBODIMENTS

Figure 1:
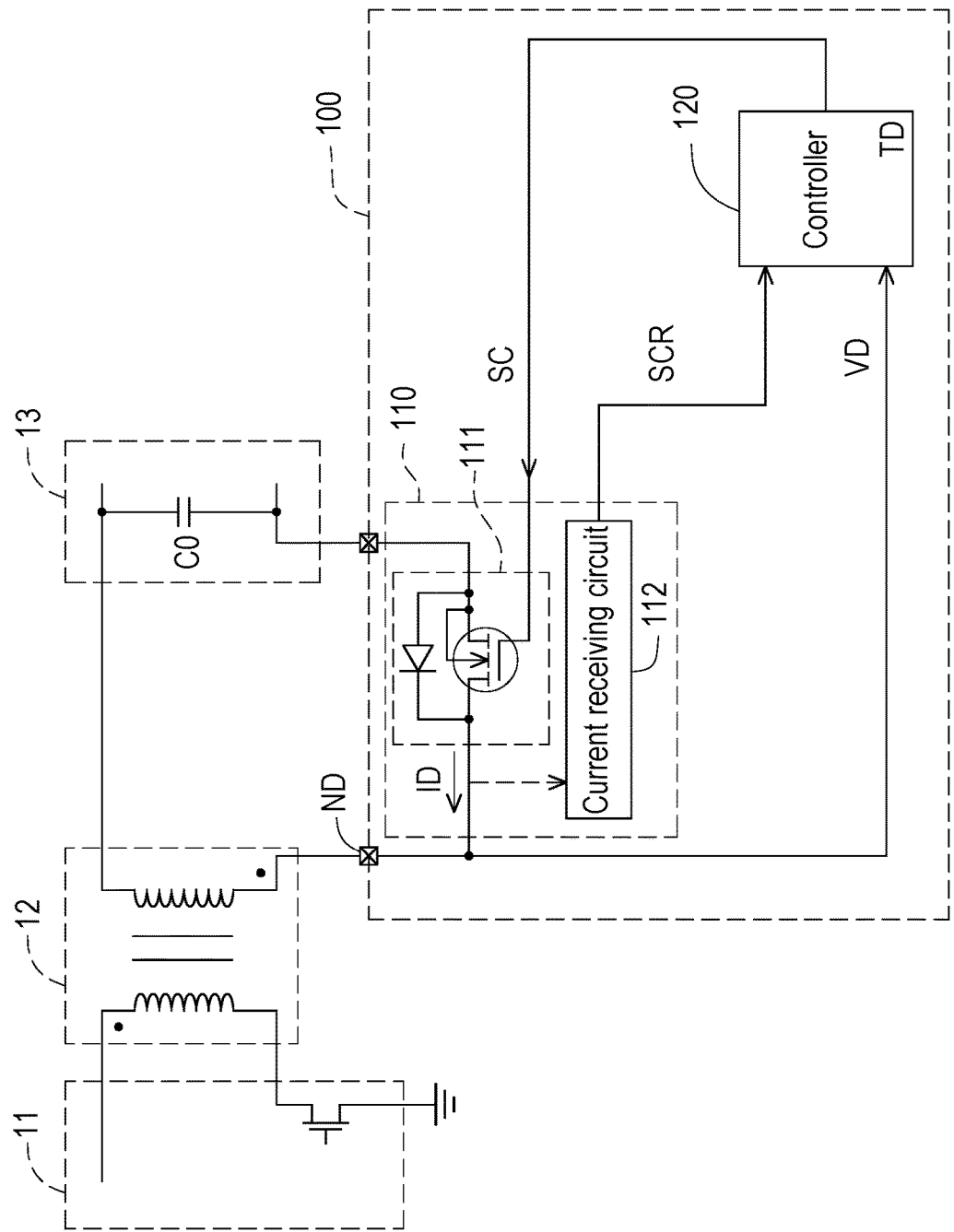
FIG. 1 is a schematic diagram of a power converter according to a first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the system and method in the claims of the disclosure.

Referring to FIG. 1. FIG. 1 is a schematic diagram of a power converter according to a first embodiment of the disclosure. In the embodiment, a power converter 10 includes a primary circuit 11, a transformer 12, a secondary circuit 13 and a synchronous rectifier device 100. Taking the embodiment as an example, a primary winding of the transformer 12 is coupled to the primary circuit 11. A secondary winding of the transformer 12 is coupled to the secondary circuit 13. The secondary circuit 13 includes an output capacitor C0. Taking the embodiment as an example, a first terminal of the output capacitor C0 is coupled to a first terminal of the secondary winding of the transformer 12. A second terminal of the output capacitor C0 is coupled to a ground terminal of the secondary circuit 13.

In the embodiment, the synchronous rectification device 100 is used for a synchronous rectification operation of the power converter 10. The synchronous rectifier device 100 includes a synchronous rectification circuit 110 and a controller 120. The synchronous rectification circuit 110 includes a synchronous rectification switch 111 and a current receiving circuit 112. The synchronous rectification switch 111 is coupled between the secondary circuit 13 and the secondary winding of the transformer 12. Taking the embodiment as an example, a first terminal of the synchronous rectification switch 111 and the secondary winding are coupled to a connection node ND. A second terminal of the synchronous rectification switch 111 is coupled to the second terminal of the output capacitor C0. A control terminal of the synchronous rectification switch 111 is coupled to the controller 120.

In the embodiment, the current receiving circuit 112 receives a current ID flowing through the synchronous rectification switch 111, and provides a current signal SCR according to the current ID. In an embodiment, the current receiving circuit 112 may receive the current ID flowing through a diode element of the synchronous rectification switch 111. In an embodiment, the current receiving circuit 112 may sense the current ID flowing through the first terminal of the synchronous rectification switch 111. The current signal SCR may be information corresponding to the current ID, such as a current value of the current ID.

In the embodiment, the controller 120 is coupled to the current receiving circuit 112 and the control terminal of the synchronous rectification switch 111. The controller 120 receives the current signal SCR and analyzes the current signal SCR. The controller 120 controls the synchronous rectification switch 111 according to the current signal SCR. In a case that the synchronous rectification switch 111 is turned off, when the current signal SCR indicates that the current value of the current ID is greater than a predetermined value TD, the controller 120 turns on the synchronous rectification switch 111. In the embodiment, the controller 120 uses the control signal SC to turn on the synchronous rectification switch 111.

On the other hand, in the case that the synchronous rectification switch 111 is turned off, when the current signal SCR indicates that the current value of the current ID is less than or equal to the predetermined value TD, the controller 120 continues to turn off the synchronous rectification switch 111.

It should be noted that the current receiving circuit 112 provides the current signal SCR according to the current ID flowing through the synchronous rectification switch 111. In the case that the synchronous rectification switch 111 is turned off, when the current signal SCR indicates that the current value of the current ID is greater than the predetermined value TD, the controller 120 turns on the synchronous rectification switch 111. In this way. the synchronous rectifier device 100 may accurately perform the synchronous rectification operation of the power converter 100 according to the current ID flowing through the synchronous rectification switch 111.

For example, when the synchronous rectification switch 111 is turned off, the current ID may flow through the diode element of the synchronous rectification switch 111. When the current value of the current ID is less than or equal to the predetermined value TD, it means that the current ID is a resonance current. Therefore, the controller 120 continues to turn off the synchronous rectification switch 111. When the current value of the current ID is greater than the predetermined value TD, it means that the current ID is an output current rather than the resonant current. Therefore, the controller 120 turns on the synchronous rectification switch 111.

In the embodiment, the controller 120 may receive the detection voltage VD on the connection node ND, and determine a voltage value of the detection voltage VD. When a voltage value change of the detection voltage VD is greater than a slew rate threshold, the controller 120 turns on the synchronous rectification switch 111. When the voltage value change of the detection voltage VD is less than the slew rate threshold, the detection voltage VD may be a resonant voltage. Therefore, the controller 120 may continue to turn off the synchronous rectification switch 111.

Moreover, when the voltage value of the detection voltage VD is lower than a predetermined voltage value, the controller 120 turns on the synchronous rectification switch 111. When the voltage value of the detected voltage VD is higher than or equal to the predetermined voltage value, the controller 120 turns off the synchronous rectification switch 111.

Based on the above, the controller 120 may use the detection voltage VD as an auxiliary basis for controlling the synchronous rectification switch 111. However, the disclosure is not limited thereto. In some embodiments, the controller 120 may not receive the detection voltage VD.

In the embodiment, the synchronous rectification switch 111 and the current receiving circuit 112 are fabricated in a single semiconductor die. In other words, the synchronous rectification circuit 110 is fabricated in a single semiconductor die. The controller 120 and the semiconductor die are packaged in a same circuit package. Therefore, the synchronous rectifier device 100 may be assembled into the power converter 10.

Figure 2:
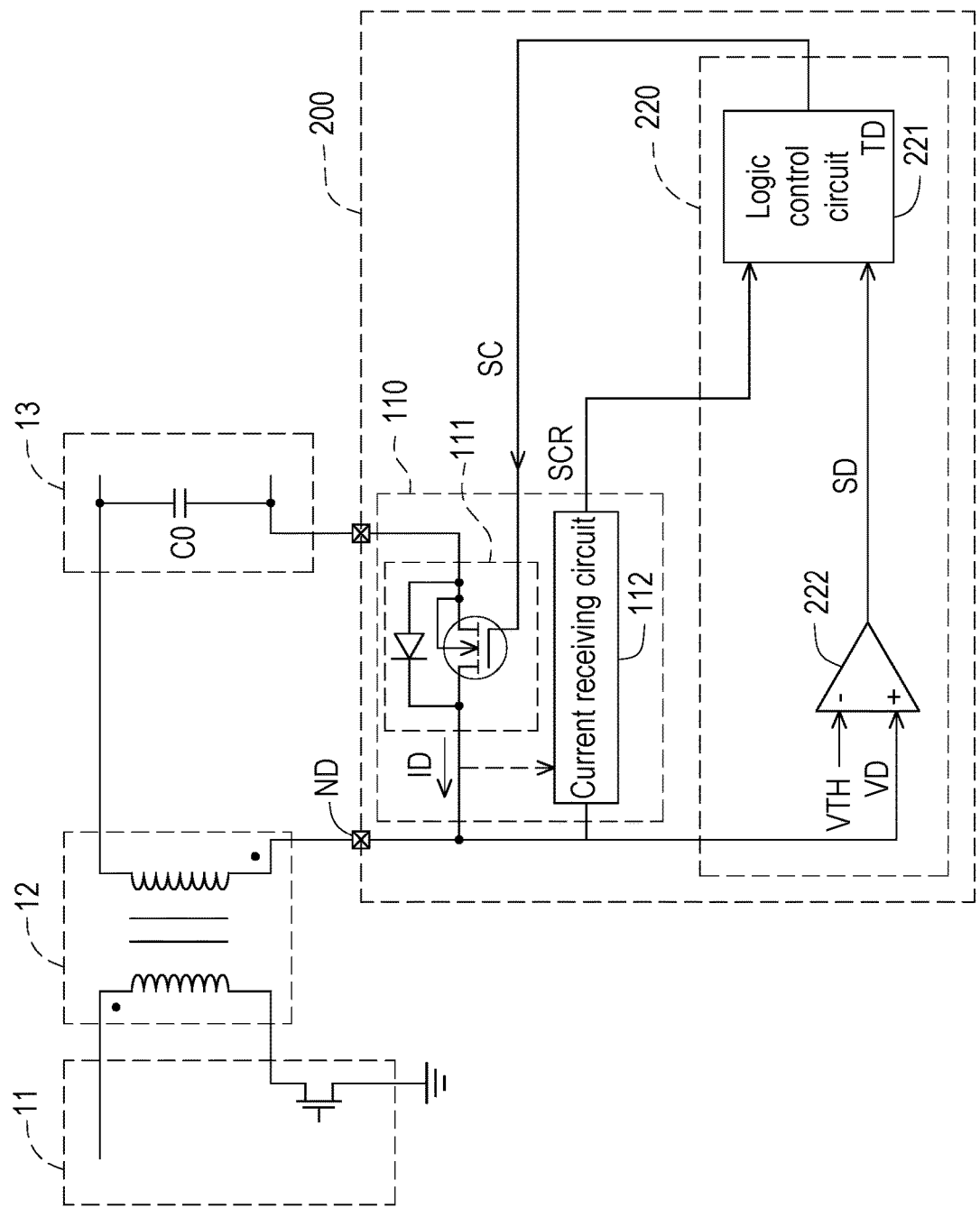
FIG. 2 is a schematic diagram of a power converter according to a second embodiment of the disclosure.

Referring to FIG. 2. FIG. 2 is a schematic diagram of a power converter according to a second embodiment of the disclosure. In the embodiment, a power converter 20 includes the primary circuit 11, the transformer 12, the secondary circuit 13 and a synchronous rectifier device 200. The synchronous rectification device 200 includes the synchronous rectification circuit 110 and a controller 220. A coupling relationship of the primary circuit 11, the transformer 12, the secondary circuit 13 and the synchronous rectification circuit 110 and the implementation of the synchronous rectification circuit 110 have been clearly described in the embodiment of FIG. 1, so that details thereof are not repeated here.

In the embodiment, the controller 220 is coupled to the current receiving circuit 112 and the control terminal of the synchronous rectification switch 111. The controller 220 includes a logic control circuit 221. The logic control circuit 221 is coupled to the current receiving circuit 112. The logic control circuit 221 provides the control signal SC for controlling the synchronous rectification switch 111 according to the current signal SCR.

In the case that the synchronous rectification switch 111 is turned off, when the current signal SCR indicates that the current value of the current ID is greater than the predetermined value TD, the logic control circuit 221 uses the control signal SC to turn on the synchronous rectification switch 111. On the other hand, in the case that the synchronous rectification switch 111 is turned off, when the current signal SCR indicates that the current value of the current ID is less than or equal to the predetermined value TD, the logic control circuit 221 continues to turn off the synchronous rectification switch 111.

In the embodiment, the controller 220 further includes a voltage determination circuit 222. The voltage determination circuit 222 is coupled to the connection node ND and the logic control circuit 221. The voltage determination circuit 222 determines the detection voltage VD on the connection node ND to generate a determination signal SD, and provides the determination signal SD to the logic control circuit 221.

In the embodiment, the voltage determination circuit 222 may be implemented by a comparator. A non-inverted input terminal of the voltage determination circuit 222 receives the detection voltage VD. An inverted input terminal of the voltage determination circuit 222 receives a voltage threshold VTH. When the voltage value of the detection voltage VD is higher than the voltage threshold VTH, the voltage determination circuit 222 provides the determination signal SD with a first logic value. The logic control circuit 221 may continue to turn off the synchronous rectification switch 111 according to the determination signal SD with the first logic value. When the voltage value of the detection voltage VD is lower than or equal to the voltage threshold VTH, the voltage determination circuit 222 provides the determination signal SD with a second logic value. The logic control circuit 221 turns on the synchronous rectification switch 111 according to the determination signal SD with the second logic value.

Figure 3:
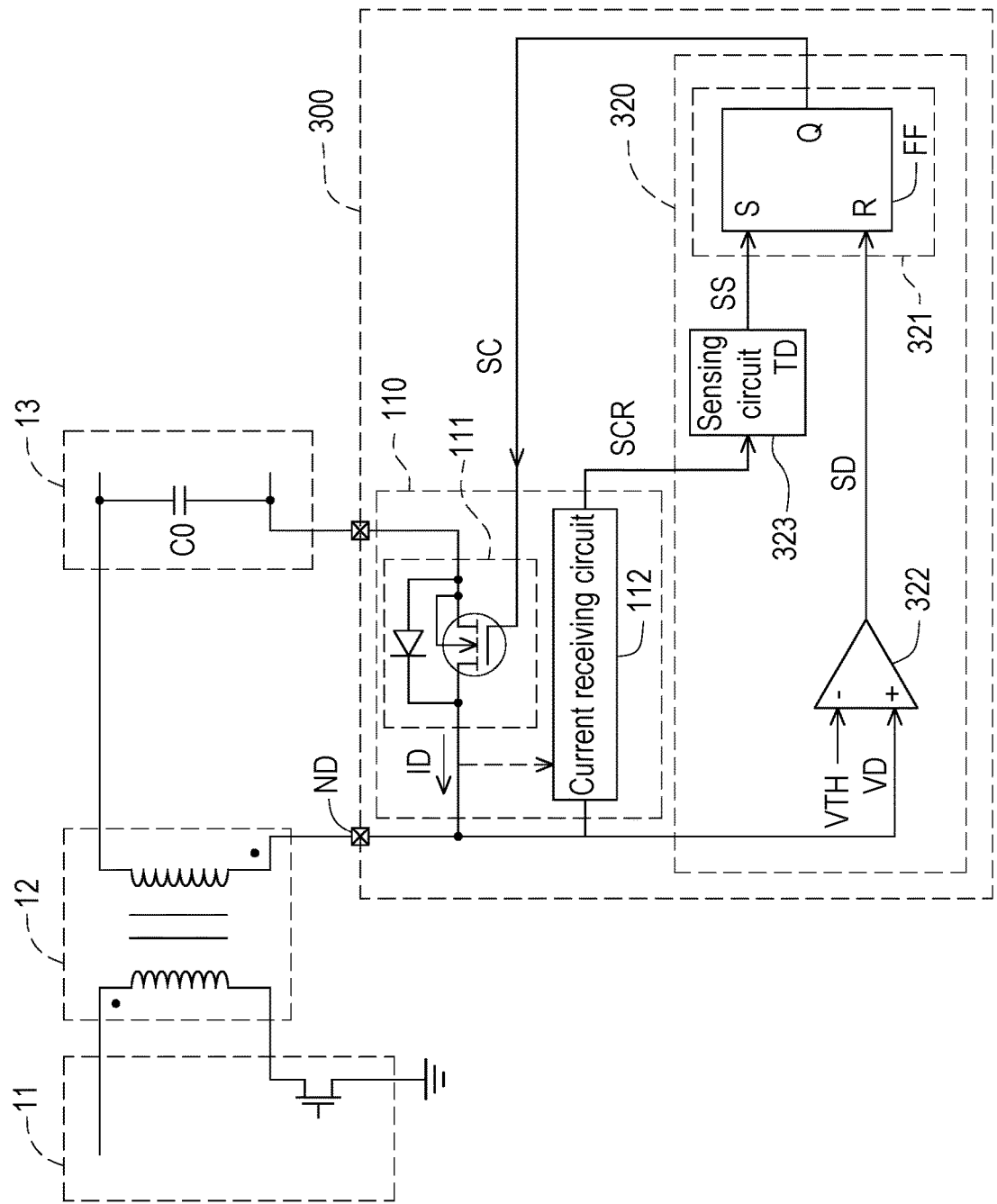
FIG. 3 is a schematic diagram of a power converter according to a third embodiment of the disclosure.

Referring to FIG. 3. FIG. 3 is a schematic diagram of a power converter according to a third embodiment of the disclosure. In the embodiment, a power converter 30 includes the primary side circuit 11, the transformer 12, the secondary circuit 13 and a synchronous rectifier device 300. The synchronous rectifier device 300 includes the synchronous rectification circuit 110 and a controller 320. A coupling relationship of the primary circuit 11, the transformer 12, the secondary circuit 13 and the synchronous rectification circuit 110 and the implementation of the synchronous rectification circuit 110 have been clearly described in the embodiment of FIG. 1, so that details thereof are not repeated here.

In the embodiment, the controller 320 is coupled to the current receiving circuit 112 and the control terminal of the synchronous rectification switch 111. The controller 320 includes a logic control circuit 321, a voltage determination circuit 322 and a sensing circuit 323.

In the embodiment, the sensing circuit 323 is coupled to the current receiving circuit 112 and the logic control circuit 321. The sensing circuit 323 generates a sensing signal SS according to the current signal SCR from the current receiving circuit 112 and provides the sensing signal SS to the logic control circuit 321. In the embodiment, the logic control circuit 221 includes a flip-flop FF. A setting terminal S of the flip-flop FF is coupled to the sensing circuit 323. A reset terminal R of the flip-flop FF is coupled to the voltage determination circuit 322. An output terminal Q of the flip-flop FF is coupled to the control terminal of the synchronous rectification switch 111.

In the embodiment, the sensing circuit 323 determines the current value of the current ID. When the current value of the current ID is higher than the predetermined value TD, the sensing circuit 323 generates the sensing signal SS with a high logic value. On the other hand, when the current value of the current ID is lower than or equal to the predetermined value TD, the sensing circuit 323 generates the sensing signal SS with a low logic value.

In addition, when the voltage value of the detection voltage VD is higher than the voltage threshold VTH, the voltage determination circuit 322 provides the determination signal SD with the high logic value. On the other hand, when the voltage value of the detection voltage VD is lower than or equal to the voltage threshold VTH, the voltage determination circuit 322 provides the determination signal SD with the low logic value.

In the embodiment, when the voltage value of the detection voltage VD is lower than or equal to the voltage threshold VTH and the current value of the current ID is higher than the predetermined value TD, the flip-flop FF may output the control signal SC (i.e., a signal with the high logic value) to turn on the synchronous rectification switch 111. When the voltage value of the detection voltage VD is higher than the voltage threshold VTH, the flip-flop FF turns off the synchronous rectification switch 111. In addition, when the current value of the current ID is lower than or equal to the predetermined value TD, the flip-flop FF may also turn off the synchronous rectification switch 111.

In summary, the synchronous rectifier device includes a synchronous rectification circuit and the controller 120. The synchronous rectification circuit includes a synchronous rectification switch and a current receiving circuit. The current receiving circuit provides a current signal based on the current flowing through the synchronous rectification switch. The controller controls the synchronous rectification switch based on the current signal. In this way, the synchronous rectifier device may accurately perform the synchronous rectification operation of the power converter based on the current flowing through the synchronous rectification switch. In addition, the synchronous rectification switch and the current receiving circuit are fabricated in a single semiconductor die. The controller and synchronous rectification circuit are packaged in a same circuit package. In this way, the synchronous rectifier device may be assembled into the power converter.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A synchronous rectifier device for a power converter, wherein the power converter comprises a secondary circuit and a transformer, the synchronous rectifier device comprising:
a synchronous rectification circuit, comprising:
a synchronous rectification switch, coupled between the secondary circuit and a secondary winding of the transformer, wherein the synchronous rectification switch and the secondary winding are connected to a connection node; and
a current receiving circuit, configured to receive a current flowing through the synchronous rectification switch, and provide a current signal based on the current; and
a controller, coupled to the current receiving circuit and a control terminal of the synchronous rectification switch, and configured to control the synchronous rectification switch according to the current signal,
wherein in a case that the synchronous rectification switch is turned off, when the current signal indicates that a current value of the current is greater than a predetermined value, the controller turns on the synchronous rectification switch,
wherein the controller comprises:
a logic control circuit, coupled to the current receiving circuit, and configured to provide a control signal for controlling the synchronous rectification switch according to the current signal;
a voltage determination circuit, coupled to the connection node and the logic control circuit, and configured to determine a detection voltage on the connection node to generate a determination signal, and provide the determination signal to the logic control circuit; and
a sensing circuit, coupled to the current receiving circuit and the logic control circuit, and configured to generate a sensing signal according to the current signal and provide the sensing signal to the logic control circuit,
wherein the logic control circuit comprises:
a flip-flop, having a setting terminal coupled to the sensing circuit, a reset terminal coupled to the voltage determination circuit, and an output terminal coupled to the control terminal of the synchronous rectification switch.

2. The synchronous rectifier device as claimed in claim 1, wherein in the case that the synchronous rectification switch is turned off, when the current signal indicates that the current value of the current is less than or equal to the predetermined value, the controller continues to turn off the synchronous rectification switch.

3. The synchronous rectifier device as claimed in claim 1, wherein:
the sensing circuit determines the current value of the current, when the current value of the current is higher than the predetermined value, the sensing circuit generates the sensing signal with a high logic value, and when the current value of the current is lower than or equal to the predetermined value, the sensing circuit generates the sensing signal with a low logic value.

4. The synchronous rectifier device as claimed in claim 1, wherein:

when a voltage value of the detection voltage is higher than a voltage threshold, the voltage determination circuit provides the determination signal with a high logic value, and when the voltage value of the detection voltage is lower than or equal to the voltage threshold, the voltage determination circuit provides the determination signal with a low logic value.

5. The synchronous rectifier device as claimed in claim 1, wherein the synchronous rectification switch and the current receiving circuit are fabricated in a single semiconductor die.

6. The synchronous rectifier device as claimed in claim 5, wherein the controller and the semiconductor die are packaged in a same circuit package.

* * * * *